United States Patent [19]
Schwartz et al.

[11] Patent Number: 4,746,923
[45] Date of Patent: May 24, 1988

[54] GAMMA FEED MICROSTRIP ANTENNA

[75] Inventors: Leonard Schwartz, Montville, N.J.; Robert Bevan, Pleasantville, N.Y.

[73] Assignee: The Singer Company, Stamford, Conn.

[21] Appl. No.: 378,575

[22] Filed: May 17, 1982

[51] Int. Cl.⁴ .................. G01S 13/60; H01Q 1/28; H01Q 3/22
[52] U.S. Cl. ................... 342/117; 343/700 MS
[58] Field of Search ............ 343/700 MS, 8; 342/117

[56] References Cited
U.S. PATENT DOCUMENTS

| | | | |
|---|---|---|---|
| 3,135,956 | 6/1964 | Dolce | 343/8 |
| 3,423,752 | 1/1969 | Schwartz | 343/8 |
| 4,180,818 | 12/1979 | Schwartz et al. | 343/700 MS |
| 4,203,116 | 5/1980 | Lewin | 343/700 MS |
| 4,320,402 | 3/1982 | Bowen | 343/700 MS |
| 4,347,516 | 8/1982 | Shrekenhamer | 343/700 MS |

OTHER PUBLICATIONS

M. I. Skdnik, Radar Handbook, McGraw-Hill Book Co., 1970, pp. 16-33-16-35.

Primary Examiner—Theodore M. Blum
Assistant Examiner—Gilberto Barrón, Jr.
Attorney, Agent, or Firm—David L. Davis

[57] ABSTRACT

A gamma feed microstrip antenna for a Doppler navigation system includes a forward firing feed parallel spaced to a backward firing feed. A plurality of parallel spaced radiating arrays are transversely connected between the feeds. Each array includes radiating elements of preselected sizes having radiating coefficients and coupling coefficients to the feeds whereby an amplitude function of the antenna along the axis of travel is a truncation of a long slanted array amplitude function. Sequential excitation of four input ports at the ends of the feeds causes sequential generation of four beams. Return signals to the antenna, at the four input ports, may be sampled and held for averaging. This antenna structure is adapted for use to as to provide frequency, temperature and over-water corrections.

1 Claim, 12 Drawing Sheets

BACK SCATTERING, LAND & WATER

POWER SPECTRUM OF DOPPLER ECHO

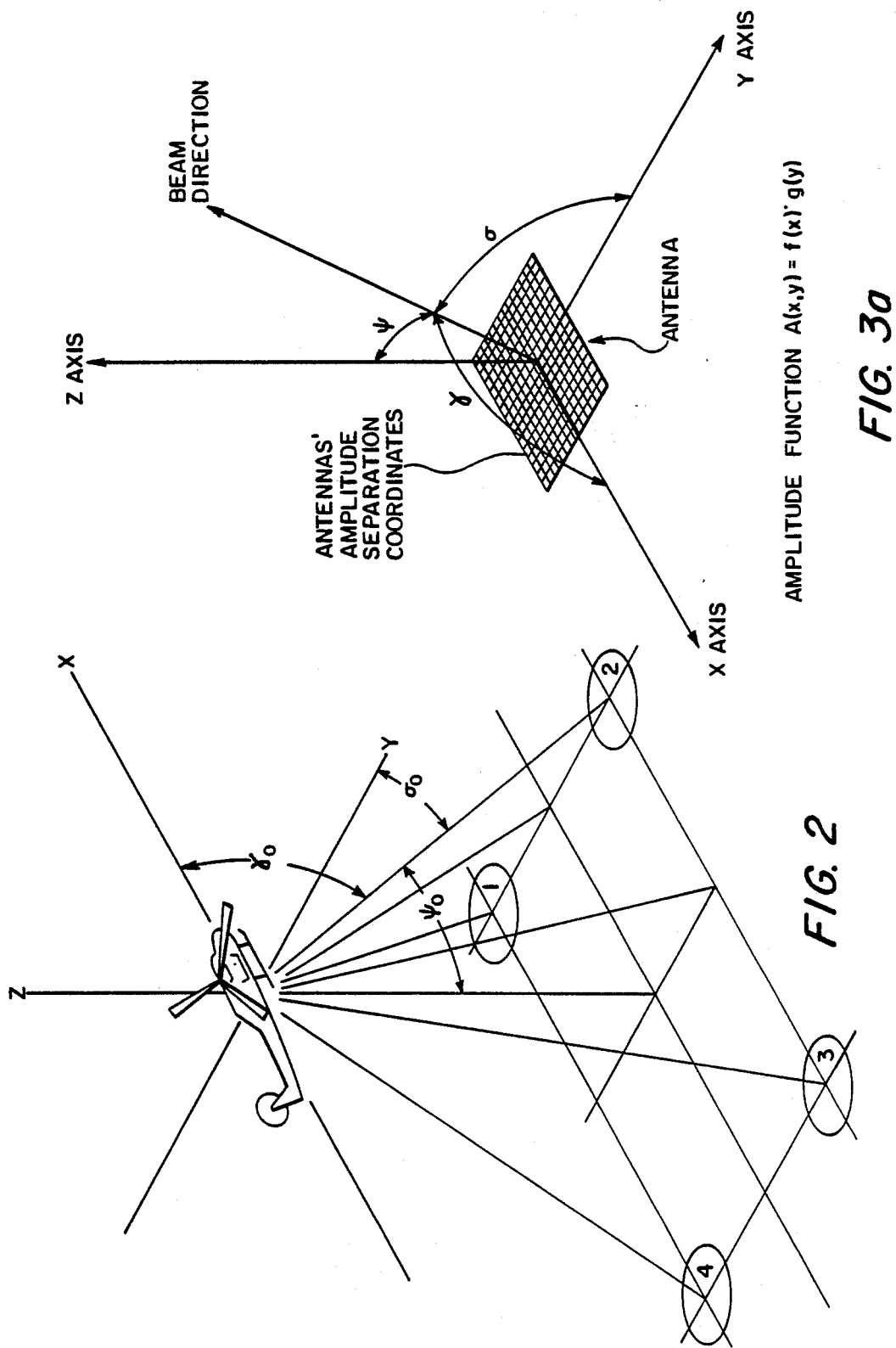

TRUNCATED SLANTED APERATURE

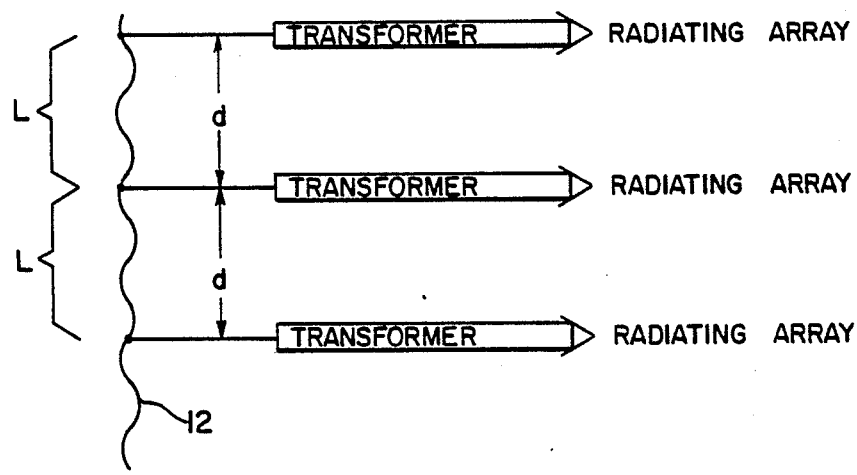
FIG. 6
FEED RELATIONSHIP
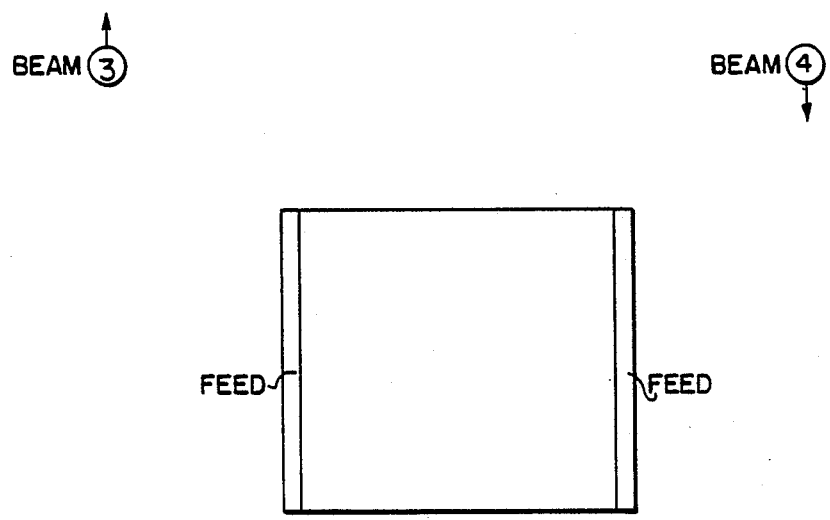
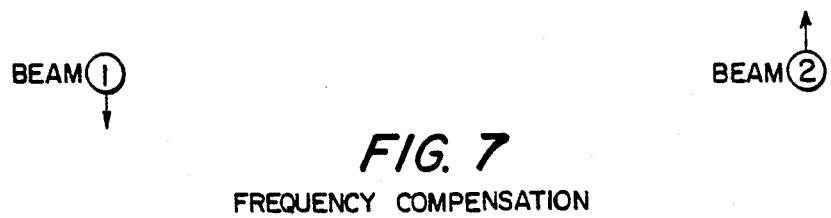
FIG. 7
FREQUENCY COMPENSATION

SLANTED X-AXIS DISTRIBUTION

Fig. 10 COUPLING AND RADIATING COEFFICIENTS

PRINCIPAL SIGMA PLANE
FAR FIELD PATTERN

4,746,923

GAMMA FEED MICROSTRIP ANTENNA

BACKGROUND OF THE INVENTION

This invention relates to microwave antennas in general and more particularly to an improved microwave antenna for use in Doppler navigation systems.

A common problem in Doppler navigation antennas is what is known as over-water shift. Because of the different characteristics of returned energy from land and water in the typical Doppler system, a shift occurs when flying over water which can lead to a considerable velocity error. One manner of overcoming this is what is known as a beam lobing technique in which each of the Doppler beams is alternated between two positions, a few degrees apart. Although such an approach has been found workable, it requires additional hardware and additional time.

Another approach is that disclosed in U.S. Pat. No. 2,983,920 granted to R. H. Rearwin and assigned to the same assignee as the present invention. Disclosed therein is a planar array of microwave antennas which are slanted at 45 degrees to permit generating a beam shape which exhibits a high degree of independence from over-water shift. However, the implementation disclosed therein is not particularly practical. U.S. Pat. No. 4,180,818 discloses the use of forward and backward firing slanted arrays to achieve frequency compensation. However, the use of slanted arrays creates other problems. Typically, an antenna aperture is bounded in a rectangular area. When a slanted antenna aperture is fitted into such a rectangular area, substantial areas of the rectangular area will not contain radiating elements. Thus the effective area and gain of the antenna are smaller than if the entire rectangular area were used.

In co-pending application Ser. No. 167,285, U.S. Pat. No. 4,347,516 assigned to the present assignee, an improvement to this prior art was made. The antenna disclosed therein solves the problems of the previously mentioned prior art by providing a rectangular antenna aperture which generates an antenna pattern very similar to the slanted aperture antenna. Although this antenna realizes the objectives of reducing over-water shifts and achieving frequency compensation while using the entire rectangular mounting area, frequency/temperature compensation occurs for individual beams of a multi-beam antenna output. Further, the single beam compensation technique of the co-pending application also has limitations in first side lobe level and wide angle sidelobes caused by the method of pattern generation therein.

BRIEF DESCRIPTION OF THE PRESENT INVENTION

The present invention is an improvement of the antenna discussed in connection with the co-pending application. The invention is a gamma feed microstrip antenna which uses a four beam frequency/temperature compensation technique in the gamma direction. Using this antenna structure, the sum of the four beams are frequency/temperature compensated rather than the individual beams as in the co-pending application. The advantage of the present technique is that superior pattern performance is achieved because the antenna does not require extra microstrip lines to feed each gamma radiating array. Further, the present invention does not suffer from the limitations in first sidelobe level and wide angle sidelobes which, as previously mentioned, are disadvantages of the single beam compensation technique.

The net result of the present invention is an improvement in antenna gain of about 3.5 db higher for the gamma feed antenna and sidelobe performance is significantly better than the single beam antenna.

Whereas in the co-pending application, the antenna is divided into two sigma halves, the present invention achieves over-water correction by dividing the antenna into two gamma halves and overcompensating the first half.

The above-mentioned objects and advantages of the present invention will be more clearly understood when considered in conjunction with the accompanying drawings, in which:

BRIEF DESCRIPTION OF THE FIGURES

FIG. 2 is a diagram showing four slanted beams radiated from two antenna apertures.

FIG. 3a is a diagram of a coordinate system for a conventional rectangular antenna.

FIG. 6 is a diagrammatic illustration of the interconnection of radiating arrays to a respective feed, via a transformer.

FIG. 7 is a diagrammatic representation of the beam changes, relative to the normal of the inventive antenna in order to achieve frequency compensation.

FIG. 10 is a computer printout of the coupling and radiating coefficients of the present invention.

DETAILED DESCRIPTION OF THE INVENTION

Figure 1A:
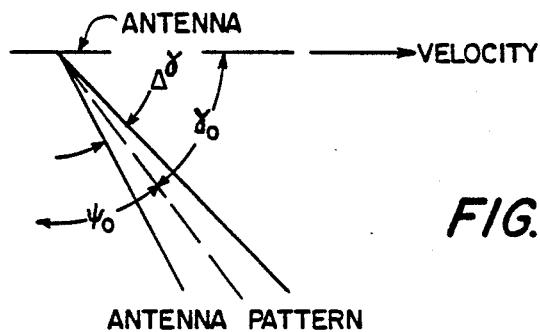
FIG. 1a is a diagram showing a typical antenna radiation pattern.
Figure 1B:
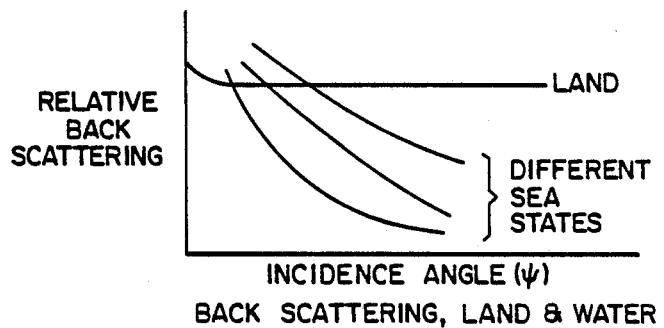
FIG. 1b illustrates typically back scattering functions.
Figure 1C:
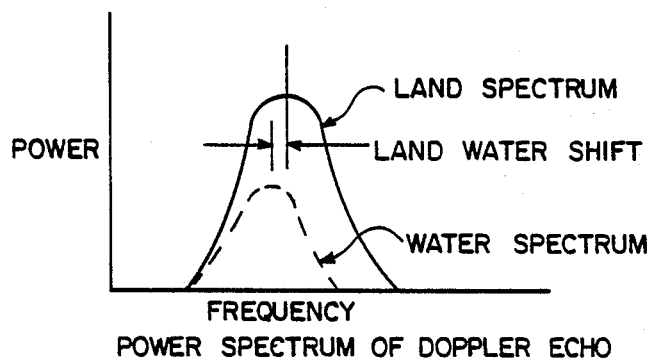
FIG. 1c is a further diagram showing the effect of land-water shift.

Regardless of the technique used to track the Doppler echo, all Doppler radars will experience a land-water shift unless specific effort is taken in the design to eliminate this shift. To discuss the mechanism of the land-water shift, consider a simple single-beam system where $\gamma_0$ (the angle between the velocity vector and the center of the radiated beam) and $\psi_0$ (the incidence angle of the beam on to the scattering surface) are in the same plane and are complementary, as shown in FIG. 1a. The antenna beam width is labeled $\Delta\gamma$. Over land, the uniform backscattering (FIG. 1b) results in a spectrum whose center is a function of $\gamma_0$ and whose width is a function of $\Delta\gamma$ (FIG. 1c). When flying over water, the backscattering is non-uniform as shown in FIG. 1b with the large $\psi$ angles (small $\gamma$ angles) having a lower scattering coefficient. Since the smaller $\gamma$ angles are associated with the higher frequencies of the Doppler spectrum, the latter are attenuated with respect to the lower frequencies thereby shifting the spectrum peak to a lower frequency. The land-water shift generally is from 1 percent to 3 percent depending on the antenna parameters.

The three-dimensional situation is more complicated. Assume an aircraft is traveling along axis X in FIG. 2. Axis Y is horizontal and orthogonal to axis X, while axis Z is vertical. Rectangular arrays generate four beams at an angle to these axes. The axis of any one of these beams (e.g., beam 2) is at an angle $\gamma_0$ to the X-axis, at an angle $\sigma_0$ to the Y axis, and at an angle $\psi_0$ to the Z axis. A conventional rectangular antenna, shown in FIG. 3a, has an amplitude function A which can be described as a product of two separate functions on the X axis and Y axis. Thus:

$$A(x,y) = f(x) \cdot g(y)$$

The antenna pattern for a conventional rectangular antenna is therefore said to be "separable" in $\gamma$ and $\sigma$. Since the scattering coefficient over water varies with angle, it is desirable to have an antenna pattern which is separable in $\gamma$ and $\psi$ instead of $\gamma$ and $\sigma$. This type of antenna pattern would largely eliminate the land-water shift.

Figure 3C:
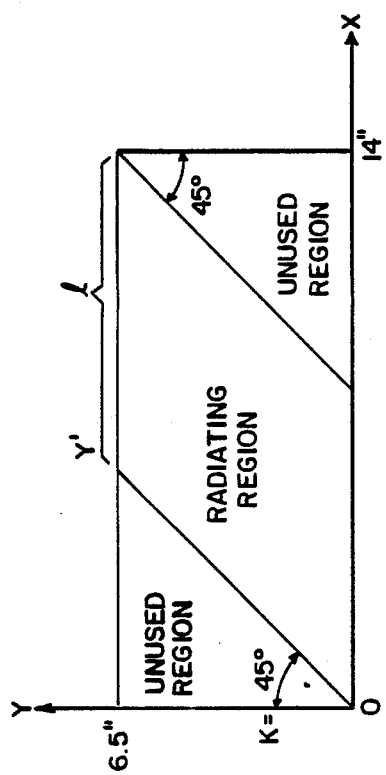
FIG. 3c is a diagram of a slanted aperture antenna with a slant angle of 45 degrees.
Figure 3B:
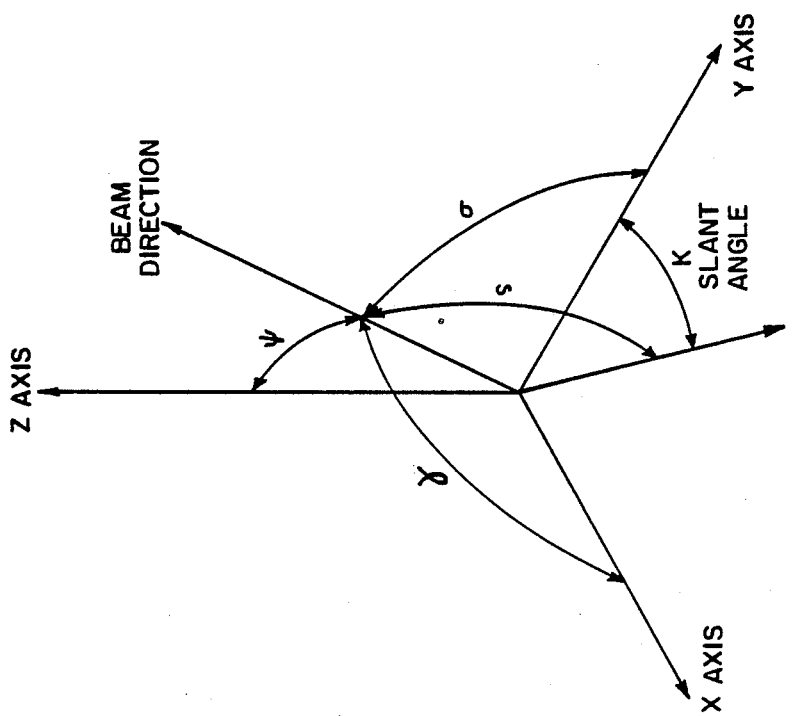
FIG. 3b is a diagram of a slanted axis coordinate system.

FIG. 3b shows a slanted-axis coordinate system intended to achieve an antenna pattern separable in $\psi$ and $\gamma$. The Y' axis is a projection of the beam axis onto the X-Y plane. The Y' axis is at angle K to the Y axis.

FIG. 3c shows a slanted aperture antenna with a slant angle of K=45°. The amplitude function for this antenna is a product of two separate functions on the X axis and Y' axis.

$$A(x,y') = f'(x) \cdot g'(y')$$

The antenna pattern for the slanted aperture antenna is separable in $\gamma$ and $\xi$, where $\xi$ is the angle between the Y' axis and the beam axis. Near the center of the beam, the antenna pattern is also separable (to a close approximation) in $\gamma$ and $\psi$, and is thus largely independent of the land-water shift. However, FIG. 3c also shows that the slanted aperture antenna leaves substantial parts of the rectangular mounting area unused. Thus, the gain for the slanted aperture antenna is lower than if the entire rectangular area contained radiating elements. Furthermore, the shortness of the radiating arrays in the slanted array antenna limits the number of radiating elements in each array, which can produce an unacceptably low insertion loss.

Figure 4:
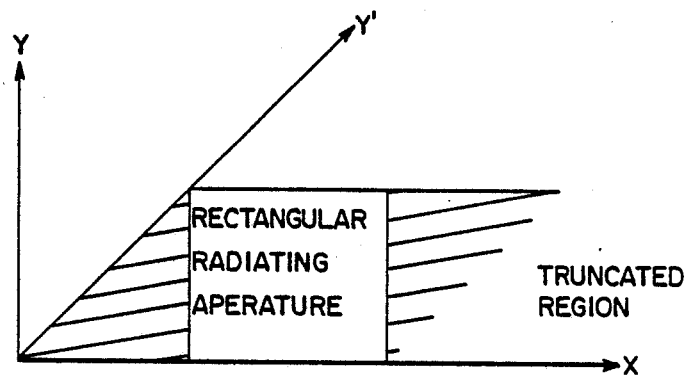
FIG. 4 is a diagrammatic representation of a truncated slanted aperture.

However, as shown in FIG. 4, it is possible to generate a slanted aperture, truncate it and derive a rectangular aperture which maintains the desired separability. Furthermore, it is possible to modify the slant angle such that a degree of overcompensation is achieved which counteracts the effects of truncating the original aperture. These are the basic design considerations of the present invention.

Using this design approach, the truncated aperture is obtained for one half of the actual antenna and the resulting radiating conductances folded such that the feed system is reciprocal. This modified aperture is then duplicated to form the second half of the antenna.

In a preferred embodiment of the invention, it is necessary to rotate the feeds and radiating array 90 degrees in order that a simplified feed system can be utilized while maintaining frequency compensation and overwater bias correction.

Figure 5:
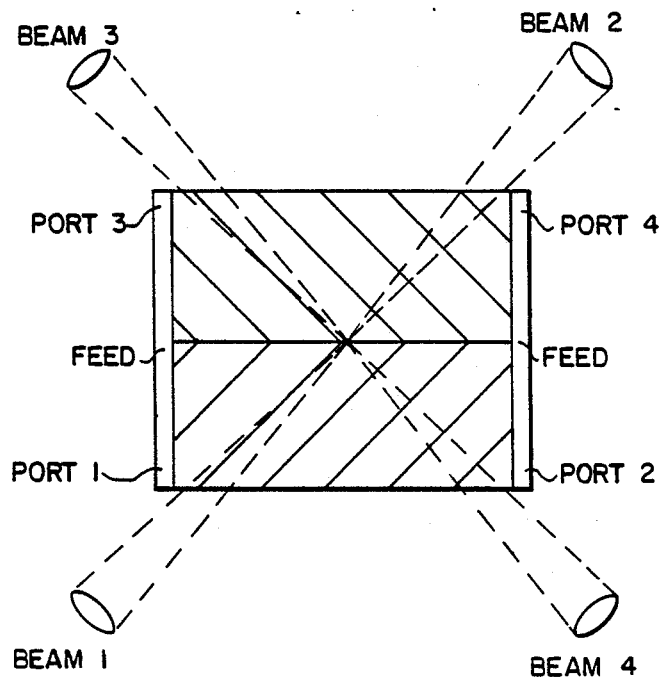
FIG. 5 is a diagrammatic illustration of the antenna with its ports and respective beams indicated.

For the over-water correction to be obtained, it is necessary that the relationship of the feed port and the slanted distribution be maintained. FIG. 5 illustrates this point.

In the illustration it can be seen that energy entering the antenna from any port generates a slanted beam such that alternate pairs have the same slant, i.e., pair 1, 2 and pair 3, 4.

By the very nature of the antenna each feed sees both slant distributions. For example, the left hand feed when fed from Port 1 generates one slanted distribution over its first half and the opposite or opposing slant over its second. In the limit if equal power was radiated from each half of the feed there would be no over-water correction. By varying the slant angle to overcompensate the first half of the feed and arranging the amplitude such that a significant amount of power is radiated from the same half, it is possible to optimize the antenna for maximum gain and minimum overwater shift.

Previous microstrip antennas utilized a composite beam, frequency compensation system, in which each beam was made up of two beams which move in opposite directions for a given frequency shift. This approach, while it resulted in excellent frequency compensation, required an extremely complex array and feed system. In the present antenna a simplified beam pair compensation is used. Temperature effects are physical changes which affect the radiating structure in the same manner as frequency changes and are therefore compensated in the same way as frequency.

As stated previously the "gamma" beams are generated by the feeds which run parallel to the antenna's longitudinal axis. One feed is forward firing and the other back firing. One feed port is fed at a given time and generates a single beam.

Each feed, be it forward or back firing can be represented in an equivalent circuit as a series of power couplers feeding each radiating array (FIG. 6), spaced a distance "d" apart. To those skilled in the art, computations are made to determine the electrical path length required to generate either the forward or back firing beam, at the desired pointing angle. This is physically accomplished by fitting a sinusoidal feed line 12 (FIG. 6) in the predetermined space.

The pointing angle is defined by $$\pm \cos\theta = \sqrt{\epsilon} + \sqrt{\epsilon}\,\frac{L}{d} - m\frac{\lambda}{d}$$

where
  $\lambda$ is the free space wave length
  $\epsilon$ is the effective dielectric constant of the microstrip substrate
  m is an integer.
In this case m=1 is the first order beam.

A change in frequency causes the forward and back firing beams to shift, referenced to the antenna normal, in opposite directions. Since an antenna system averages the "gamma" related Doppler information from all four beams, frequency compensation is achieved when pairs of beams move in opposite directions for a given frequency change.

The actual frequency compensation is illustrated in FIG. 7 which indicates that as the frequency increases, for example, beams 1 and 3 shift in gamma away from the normal and beams 2 and 4 shift toward the normal. If the beam shifted equally with frequency, the antenna would be fully compensated. However, the rate of change of the back firing array with frequency is slightly different than that of the forward firing array. This difference is less than 0.00025 degree per MHz change of operating frequency which is negligible.

Figure 8:
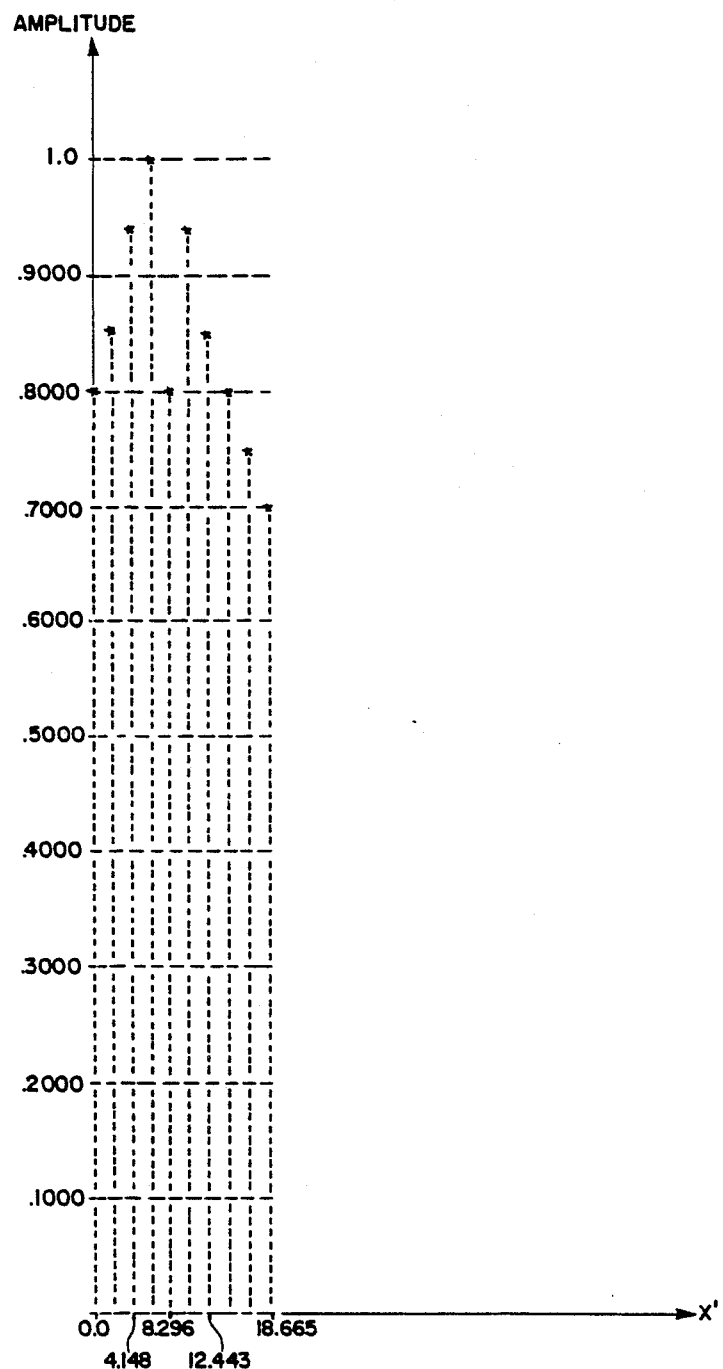
FIG. 8 is a computer printout of slanted X-axis distribution for the present invention.

FIG. 8 is a slanted X-axis amplitude distribution as would be generated by a computer printout for a typical antenna, in accordance with the present invention based upon typical required beam widths and pointing angles. The illustrated distribution is on a slanted axis which may be converted by use of a computer program to the desired rectangular aperture. However, the computer aspect is not, per se, part of the present invention.

Figure 9:
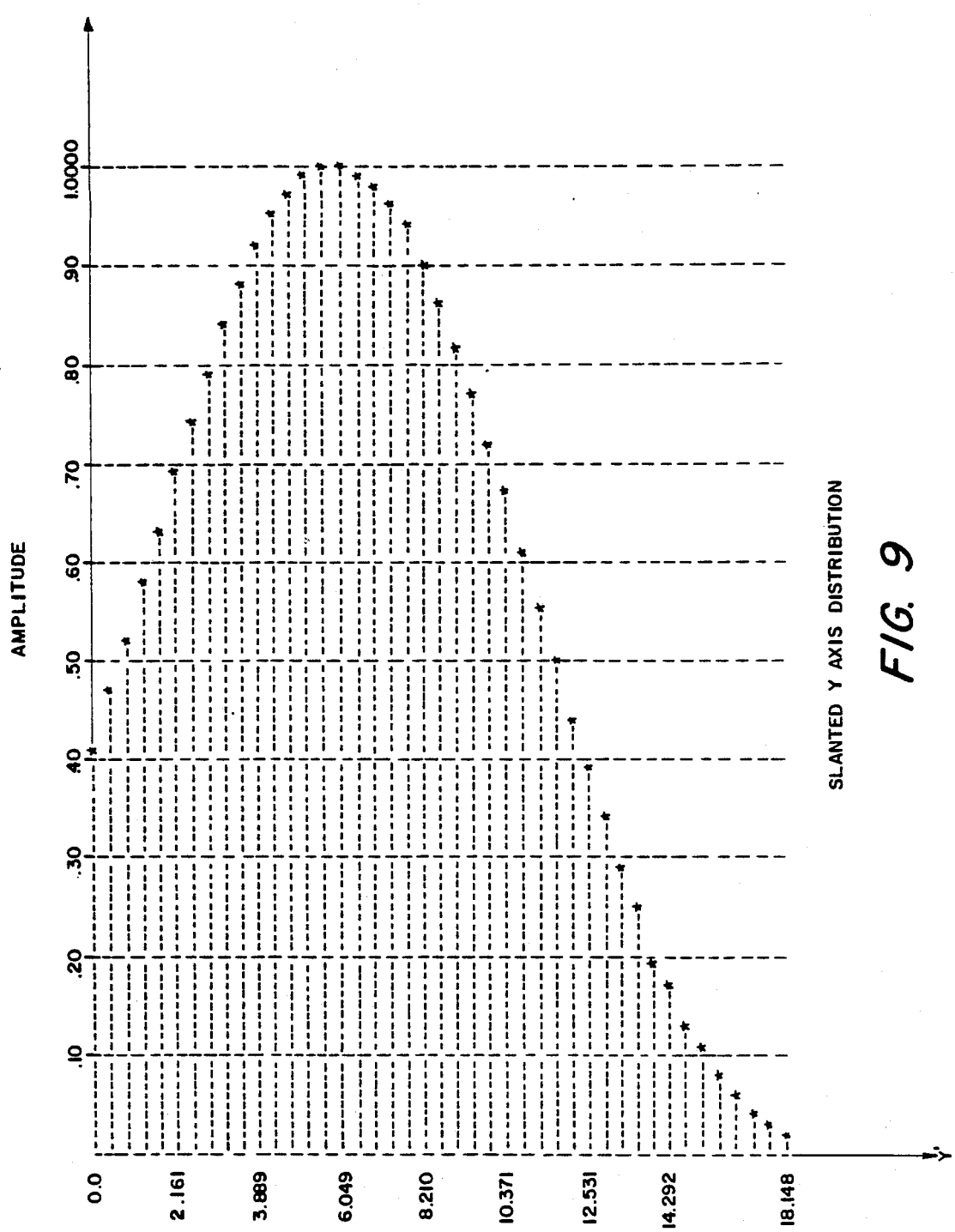
FIG. 9 is a computer printout of the slanted Y-axis distribution of the present invention.

FIG. 9 is a similar type of computer printout showing slanting Y-axis amplitude distribution.

Figure 13:
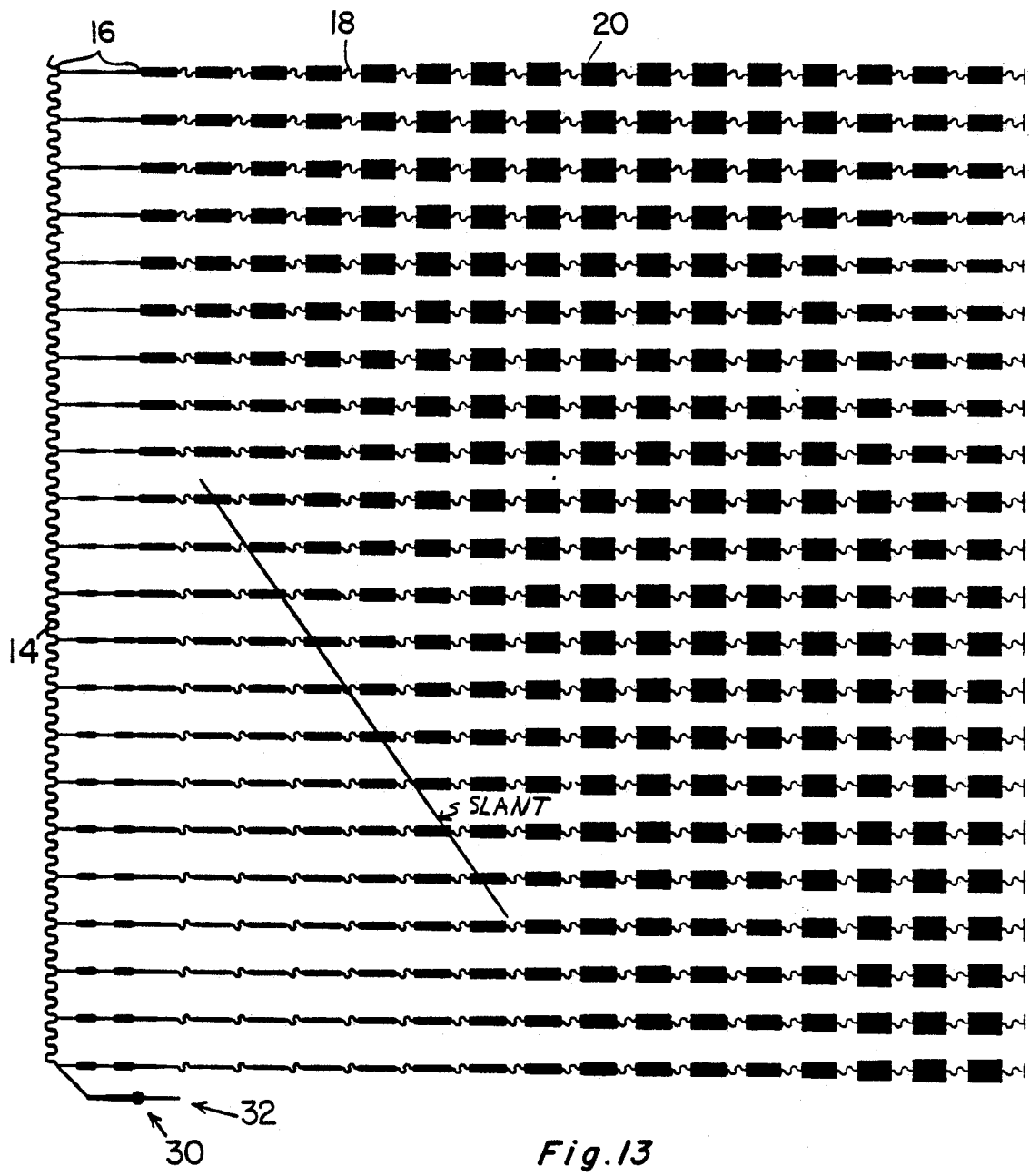
FIG. 13 illustrates a section of the present antenna structure.
Figure 14:
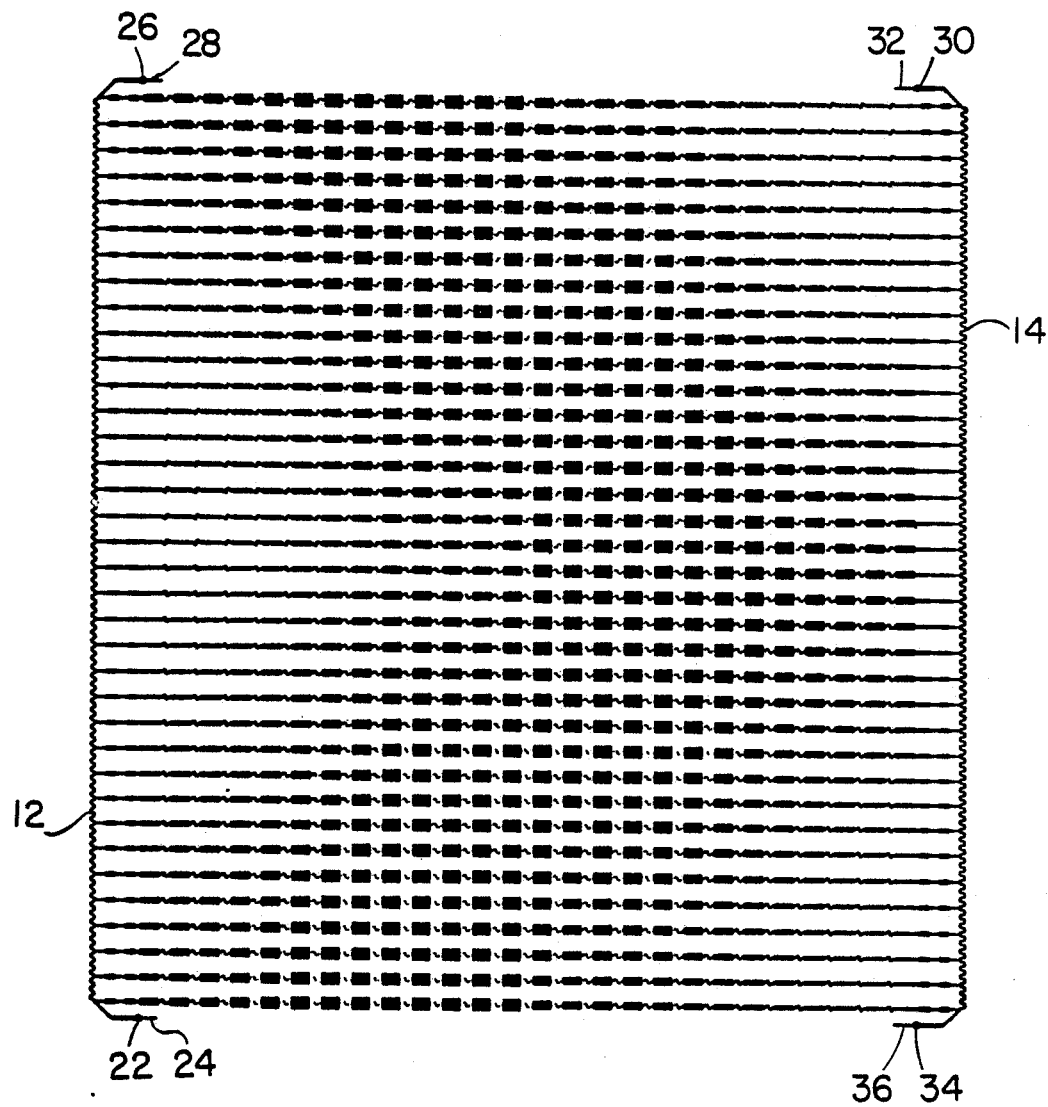
FIG. 14 illustrates the present antenna structure.

The antenna structure of the present invention is shown in FIG. 14 wherein backward firing feed 12 is illustrated as being parallel with the forward firing feed 14. In a preferred embodiment of the invention as illustrated, 36 arrays are connected between the feeds 12 and 14. The arrays are typically spaced 0.375 inch apart along the feed. FIG. 13 illustrates the upper right-hand portion of the antenna and shows the structure in greater detail. Thus, a conductive portion in the nature of transformer 16 is connected at one end thereof to an adjacent feed (14) and an opposite end to an adjacently situated radiating element. The radiating elements for the antenna have been indicated by reference numeral 20. Each array has 26 elemehts, typically spaced 0.442 inch apart. These spacings were selected to minimize the generation of second order beams. The radiating elements are separated from one another by a connecting array phase link 18. An input pad 30 provides a point for introducing energy to feed 14 while a conductive matching stub 32 extends a small distance from the input pad 30.

FIG. 14 illustrates the entire radiating structure wherein additional input pads are indicated at reference numerals 26, 22 and 36 while corresponding matching stubs are indicated at reference numerals 28, 24 and 34.

The transformer 16 serves as an impedance transformer and presents preselected impedance levels at the feed taps for the various arrays. It is necessary to have a certain coupling value to each array to achieve a certain pattern. The design criteria for determining the necessary impedance is a conventional technique.

In operation of the antenna, energy provided at a particular input pad (port) allows energy to propagate along a corresponding feed and as this energy does so, each array will tap off a portion of that energy for propagation along the array. Providing each input pad (port) with energy results in the generation of a corresponding beam. Energy switching is accomplished by means of a conventional microwave switch (not shown).

Upon return of a reflected signal, a storing system (not shown) connected to the antenna of FIG. 14 stores the doppler information relative to the gamma direction for each beam, individually. Thereafter, the data from the four beams is averaged by conventional means. The system will continually update this beam generation and averaging condition.

Figure 10:
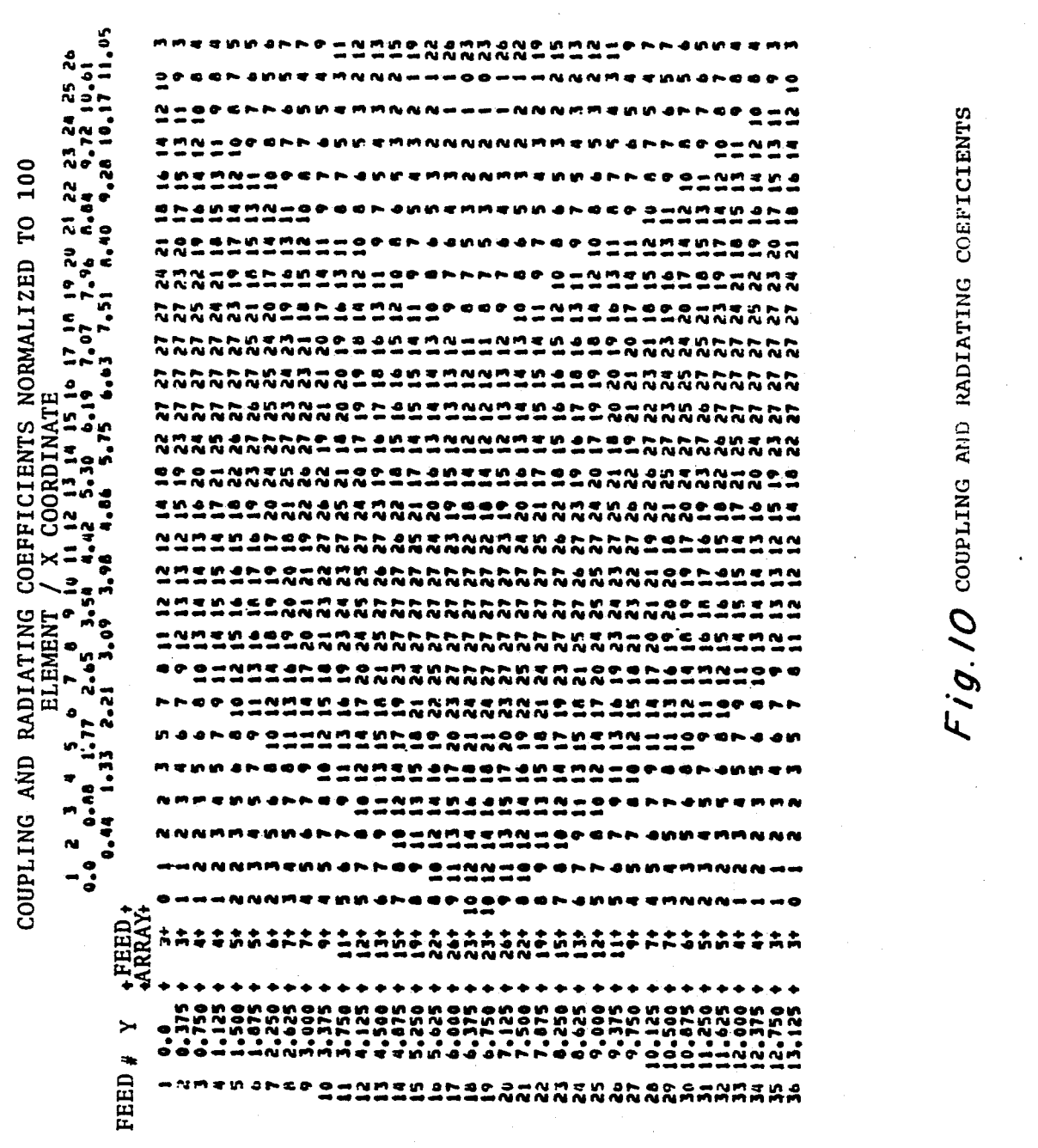

FIG. 10 is a computer printout of a typical antenna's full aperture feed and coupling coefficients. This data, when considered along with particular substrate data, may be used by one of ordinary skill in the art to generate final artwork for the microstrip antenna. In FIG. 10, the various feed tapoffs to corresponding, arrays are numbered 1-36 while the Y coordinate for each feed is indicated in inches. The coupling and radiating coefficients are listed for each element in each array.

Figure 11:
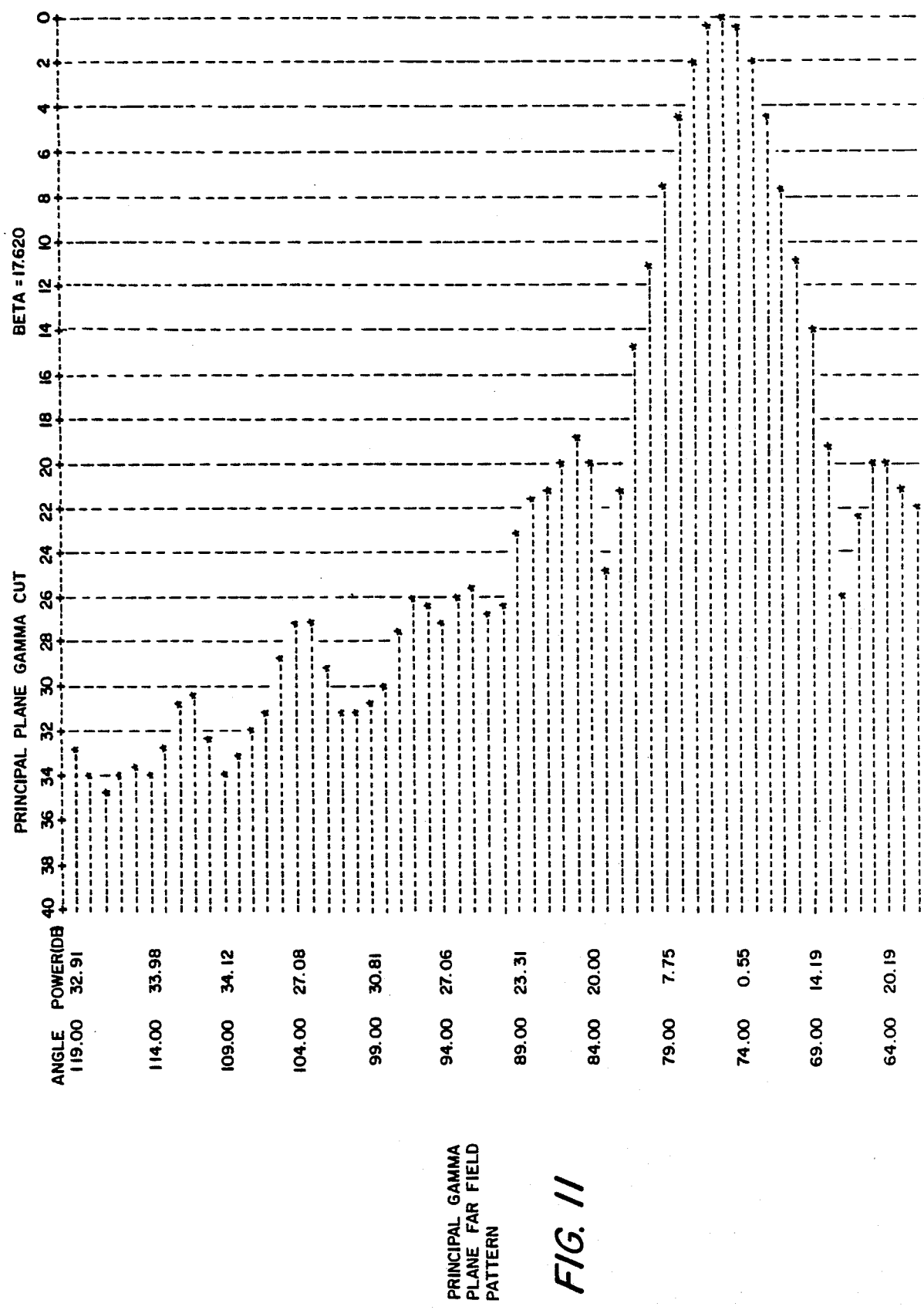
FIG. 11 illustrates the principal gamma plane far field pattern.
Figure 12:
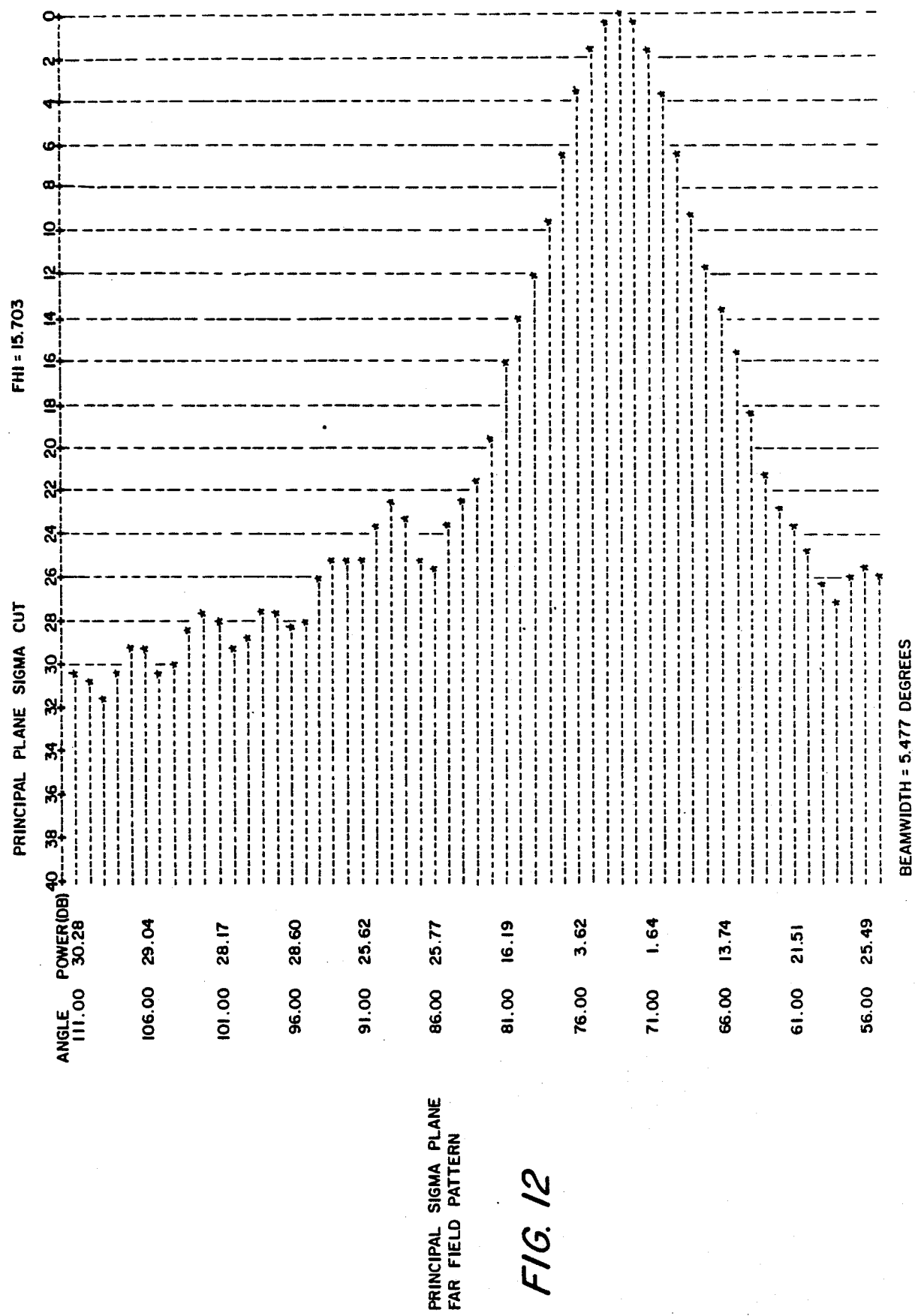
FIG. 12 illustrates the principal sigma plane far field pattern.

The computer patterns for principal plane cuts are shown in FIGS. 11 and 12, with FIG. 11 illustrating the principal gamma plane far field pattern and FIG. 12 the principal sigma plane far field pattern. Both patterns in FIGS. 11 and 12 are based upon the coupling and radiation coefficients defined in FIG. 10.

It should be understood that the invention is not limited to the exact details of construction shown and described herein for obvious modifications will occur to persons skilled in the art.

We claim:

1. A method for achieving frequency/temperature compensation for a gamma feed microstrip antenna for Doppler navigation systems, said antenna being of the type having an axis of travel and having a longitudinal axis of symmetry, said axis of symmetry intersecting said axis of travel and being disposed perpendicular thereto and comprising:

a forward firing gamma feed means disposed parallel to the axis of travel and disposed perpendicular to the axis of symmetry and having first and second ends;

a backward firing gamma feed means disposed parallel to the forward firing feed means and disposed perpendicular to said axis of symmetry;

a plurality of parallel gamma feed radiating arrays transversely connected between the feed means and disposed parallel to said axis of symmetry;

means connected to the ends of the feed means for providing four input ports to the antenna, wherein each array includes (a) first impedance transformer means connected at a first end thereof to the forward firing feed means;

(b) serially connected radiating elements of preselected sizes connected at a first end thereof to a second end of the transformer means, said radiating elements being arranged symmetrically about said axis of symmetry;

(c) second impedance transformer means connected at a first end thereof to the backward firing feed means and at a second end thereof to the second end of the serially connected radiating elements; and (d) link means connected between the radiating elements for establishing a preselected array phase;

said method comprising the steps;

generating four separate beams in response to the sequential excitation of said four corresponding antenna input ports;

sampling and storing the returned signal from each said port; and averaging the signals returned to the ports.

* * * * *